United States Patent
Ansari et al.

(10) Patent No.: US 12,470,954 B2
(45) Date of Patent: Nov. 11, 2025

(54) NOTIFYING LOCAL VEHICLE-TO-EVERYTHING MISBEHAVIOR TO RECEIVE-SIDE LOCAL MISBEHAVIOR DETECTION SYSTEM

(71) Applicant: QUALCOMM Incorporated, San Diego, CA (US)

(72) Inventors: Mohammad Raashid Ansari, Lowell, MA (US); Subrato Kumar De, San Diego, CA (US); Jonathan Petit, Wenham, MA (US); Jean-Philippe Monteuuis, Shrewsbury, MA (US); Cong Chen, Shrewsbury, MA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 17/655,130

(22) Filed: Mar. 16, 2022

(65) Prior Publication Data
US 2023/0300640 A1     Sep. 21, 2023

(51) Int. Cl.
H04W 24/04     (2009.01)
H04W 4/40      (2018.01)

(52) U.S. Cl.
CPC ............ H04W 24/04 (2013.01); H04W 4/40 (2018.02)

(58) Field of Classification Search
CPC .................................................. H04W 24/04
See application file for complete search history.

(56) References Cited

U.S. PATENT DOCUMENTS

| | | | |
|---|---|---|---|
| 2018/0082058 A1* | 3/2018 | Ferragut | G06F 21/552 |
| 2018/0255082 A1* | 9/2018 | Ostergaard | G06N 20/00 |
| 2019/0312896 A1 | 10/2019 | Petit et al. | |
| 2020/0137580 A1* | 4/2020 | Yang | H04W 12/122 |
| 2020/0139980 A1* | 5/2020 | Liu | B60W 30/12 |
| 2020/0258320 A1 | 8/2020 | Lu et al. | |
| 2021/0281986 A1* | 9/2021 | Zhu | H04W 4/40 |
| 2023/0242152 A1* | 8/2023 | Qi | B60W 60/0015 |
| | | | 701/24 |
| 2024/0000045 A1* | 1/2024 | Galvin | G06Q 10/063 |

(Continued)

FOREIGN PATENT DOCUMENTS

WO    WO-2022235973 A1 * 11/2022 ............. H04W 4/40

OTHER PUBLICATIONS

ETSI: "Intelligent Transport Systems (ITS), Security, Misbehaviour Reporting Service, Release 2", ETSI Draft Specification, 103 759, European Telecommunications Standards Institute (ETSI), 650, Route Des Lucioles, F-06921 Sophia-Antipolis, France, No. V0.0.2, Jan. 12, 2021, pp. 1-27, XP014387961, sections 4, 5.

(Continued)

*Primary Examiner* — Abdeltif Ajid
(74) *Attorney, Agent, or Firm* — Harrity & Harrity, LLP

(57) ABSTRACT

Various aspects of the present disclosure generally relate to wireless communication. In some aspects, a user equipment (UE) may detect a misbehavior condition in a local vehicle-to-everything (V2X) information source. The UE may receive an incoming V2X message. The UE may generate a misbehavior decision for the incoming V2X message based at least in part on the misbehavior condition in the local V2X information source. Numerous other aspects are described.

29 Claims, 8 Drawing Sheets

(56) References Cited

U.S. PATENT DOCUMENTS

2024/0323657 A1* 9/2024 Yang .................. G06Q 50/26

OTHER PUBLICATIONS

International Search Report and Written Opinion—PCT/US2023/061231—ISA/EPO—May 15, 2023.
Qualcomm Technologies INT: "Misbehavior Management and TS 103 759", ETSI Draft, ITSWG5(21) 057007R1, European Telecommunications Standards Institute (ETSI), 650, Route Des Lucioles, F-06921 Sophia-Antipolis Cedex, France, vol. WG ITS WG5 Security, Feb. 8, 2021 (Feb. 8, 2021), pp. 1-22, XP014394212, p. 13-p. 15.
Camp LLC: "Security Credential Management System Proof-of-Concept Implementation", EE Requirements and Specifications Supporting SCMS Software Release 1.1, Vehicle Safety Communications 5 (VSC5), Submitted to the United States Department of Transportation National Highway Traffic Safety Administration (NHTSA), May 4, 2016, 559 Pages.
ETSI TS 102 894-2, "Intelligent Transport Systems (ITS); Users and Applications Requirements; Part 2: Applications and Facilities Layer Common Data Dictionary," ETSI TS 102 894-2, V1.3.1, 650, Route des Lucioles; F-06921 Sophia-Antipolis Cedex—France, Aug. 2018, pp. 1-100.

* cited by examiner

NOTIFYING LOCAL VEHICLE-TO-EVERYTHING MISBEHAVIOR TO RECEIVE-SIDE LOCAL MISBEHAVIOR DETECTION SYSTEM

FIELD OF THE DISCLOSURE

Aspects of the present disclosure generally relate to wireless communication and to techniques and apparatuses for notifying local vehicle-to-everything (V2X) misbehavior to a receive-side misbehavior detection system (Rx-LMBDS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include detecting a misbehavior condition in a local vehicle-to-everything (V2X) information source. The method may include receiving an incoming V2X message. The method may include generating a misbehavior decision for the incoming V2X message based at least in part on the misbehavior condition in the local V2X information source.

Some aspects described herein relate to a UE for wireless communication. The UE may include a memory and one or more processors coupled to the memory. The one or more processors may be configured to detect a misbehavior condition in a local V2X information source. The one or more processors may be configured to receive an incoming V2X message. The one or more processors may be configured to generate a misbehavior decision for the incoming V2X message based at least in part on the misbehavior condition in the local V2X information source.

Some aspects described herein relate to a non-transitory computer-readable medium that stores a set of instructions for wireless communication by a UE. The set of instructions, when executed by one or more processors of the UE, may cause the UE to detect a misbehavior condition in a local V2X information source. The set of instructions, when executed by one or more processors of the UE, may cause the UE to receive an incoming V2X message. The set of instructions, when executed by one or more processors of the UE, may cause the UE to generate a misbehavior decision for the incoming V2X message based at least in part on the misbehavior condition in the local V2X information source.

Some aspects described herein relate to an apparatus for wireless communication. The apparatus may include means for detecting a misbehavior condition in a local V2X information source. The apparatus may include means for receiving an incoming V2X message. The apparatus may include means for generating a misbehavior decision for the incoming V2X message based at least in part on the misbehavior condition in the local V2X information source.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
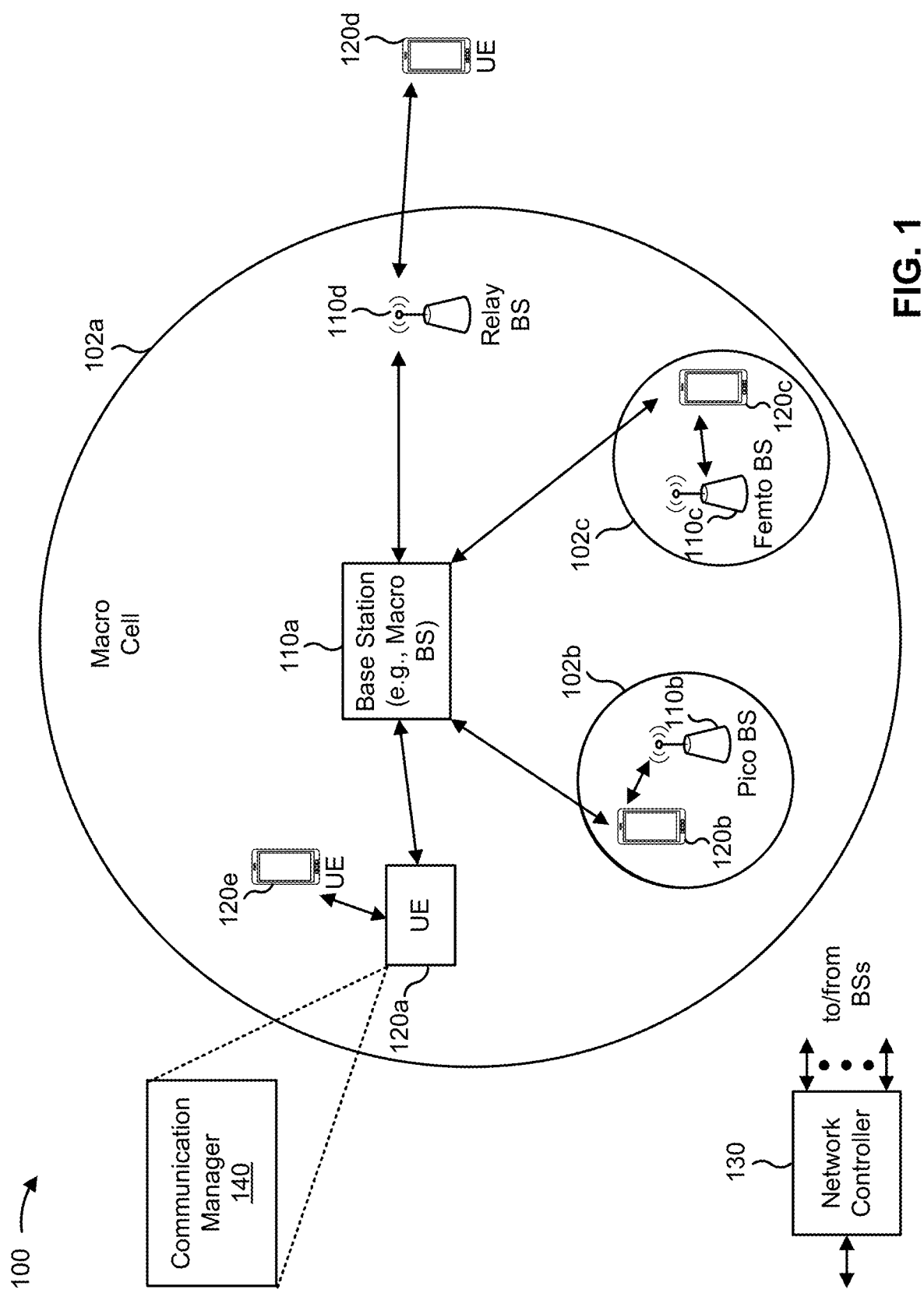
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, a vehicle-to-pedestrian (V2P) protocol, or a vehicle-to-network (V2N) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may detect a misbehavior condition in a local V2X information source; receive an incoming V2X message; and generate a misbehavior decision for the incoming V2X message based at least in part on the misbehavior condition in the local V2X information source. Additionally, or alternatively, the communication manager 140 may perform one or more other operations described herein.

As indicated above, FIG. 1 is provided as an example. Other examples may differ from what is described with regard to FIG. 1.

Figure 2:
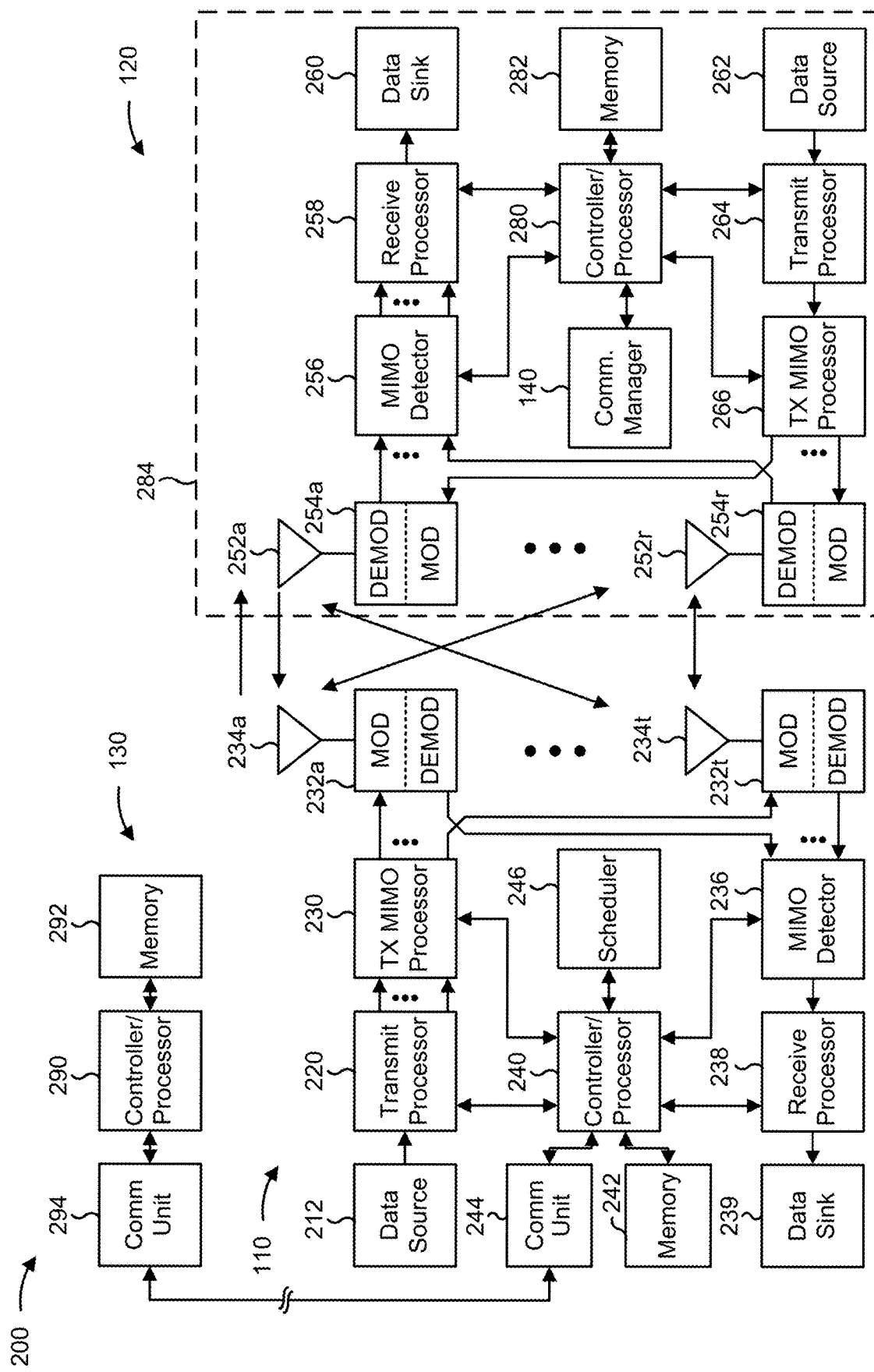
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-4C, FIG. 5, and/or FIG. 6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-4C, FIG. 5, and/or FIG. 6).

The controller/processor 240 of the base station 110, the controller/processor 280 of the UE 120, and/or any other component(s) of FIG. 2 may perform one or more techniques associated with notifying local V2X misbehavior to a receive-side misbehavior detection system (Rx-LMBDS), as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5 and/or other processes as described herein. In some examples, executing instructions may include running the instructions, converting the instructions, compiling the instructions, and/or interpreting the instructions, among other examples.

In some aspects, the UE 120 includes means for detecting a misbehavior condition in a local V2X information source; means for receiving an incoming V2X message; and/or means for generating a misbehavior decision for the incoming V2X message based at least in part on the misbehavior condition in the local V2X information source. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
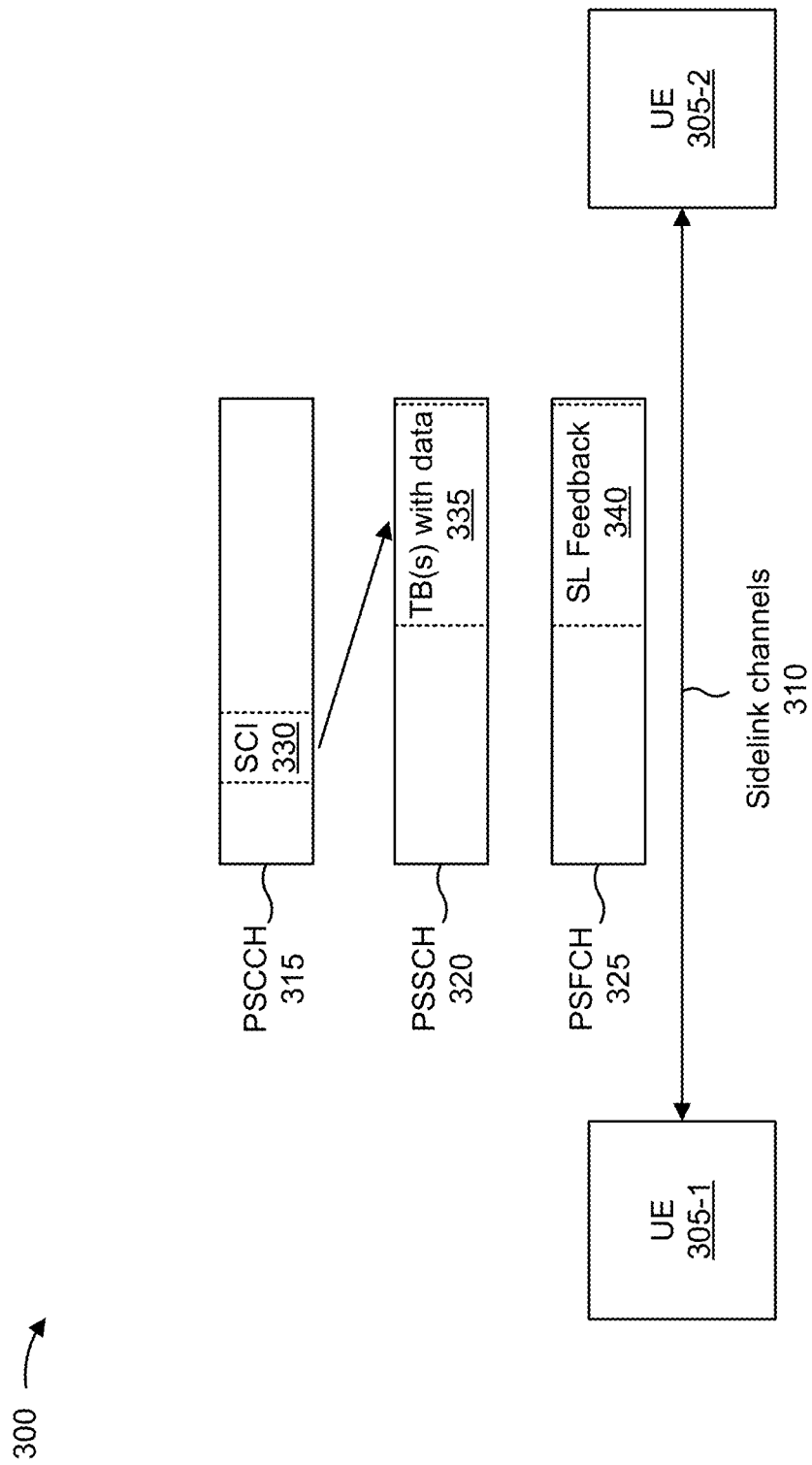
FIG. 3 is a diagram illustrating an example of vehicle-to-everything (V2X) communications via a sidelink, in accordance with the present disclosure.

FIG. 3 is a diagram illustrating an example 300 of V2X communications via a sidelink, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for V2X communications, which may include V2V communications, V2I communications, V2P communications, and/or V2N communications, among other examples. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As described herein, the UEs 305 may transmit and receive V2X communications using the one or more sidelink channels 310. For example, in some aspects, V2X transmissions may be one-to-many broadcast and/or multicast transmissions. In some aspects, V2X transmissions may not require any physical layer feedback from receiving devices, such as acknowledgement (ACK) or negative acknowledgement (NACK) feedback. In some aspects, V2X transmissions may be configured without retransmission. In some aspects, V2X transmissions may be configured with a small number of retransmissions (e.g., one retransmission) that always occur (e.g., without ACK/NACK feedback).

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include V2X data, such as a basic safety message (BSM), a cooperative awareness message (CAM), a collective perception message (CPM), a traffic information message (TIM), a signal phase and time (SPAT) message, a MAP message to convey geographic road information, a distributed environment notification message (DENM), an in-vehicle information (IVI) message, or the like. The PSFCH 325 may be used to communicate sidelink feedback 340, such as hybrid automatic repeat request (HARD) feedback (e.g., ACK/NACK information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure a RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a V2X communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming V2X transmission, such as one or more resource blocks to be used for the upcoming V2X transmission on the PSSCH 320 (e.g., for TBs 335), one or more subframes to be used for the upcoming V2X transmission, and/or an MCS to be used for the upcoming V2X transmission. In some aspects, a UE 305 may generate a sidelink grant that indicates one or more parameters for semi-persistent scheduling (SPS), such as a periodicity of a V2X transmission (e.g., a periodic V2X message, such as a BSM, a CAM, or a CPM). Additionally, or alternatively, the UE 305 may generate a sidelink grant for event-driven scheduling, such as for an on-demand V2X message.

As indicated above, FIG. 3 is provided as an example. Other examples may differ from what is described with respect to FIG. 3.

Figure 4A:
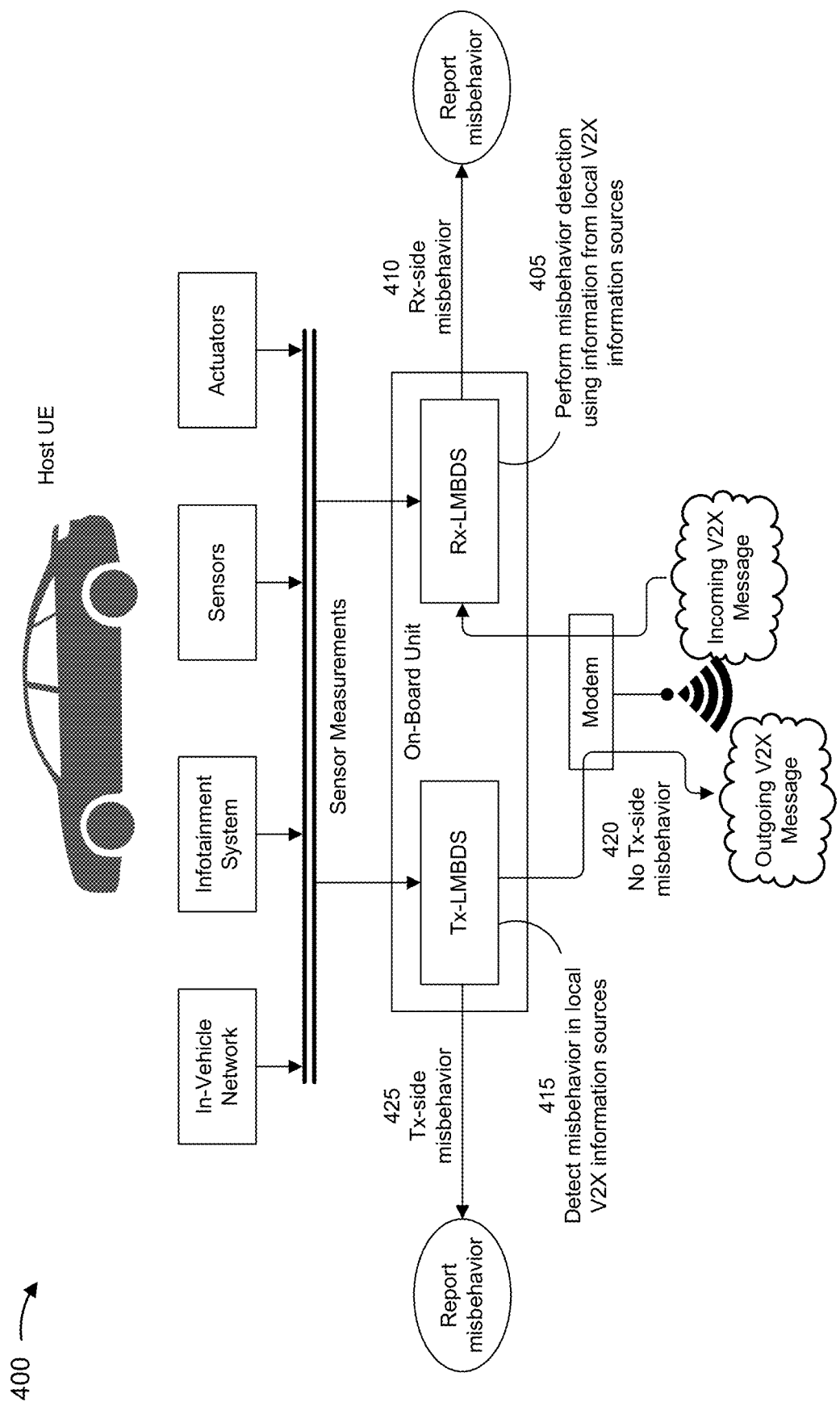
FIGS. 4A-4C are diagrams illustrating examples associated with notifying V2X misbehavior to a receive-side local misbehavior detection system (Rx-LMBDS), in accordance with the present disclosure.
Figure 4B:
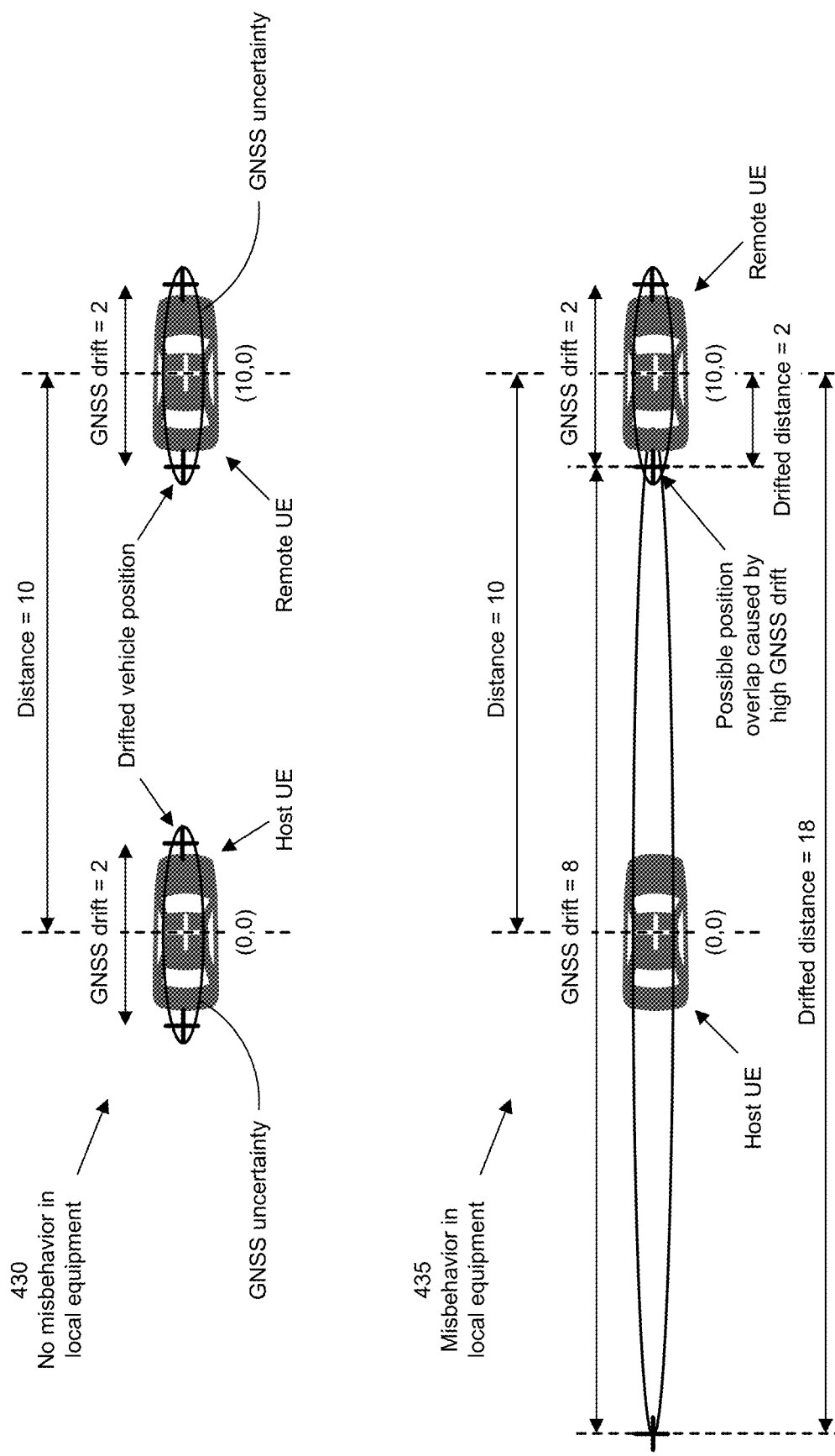
Figure 4C:
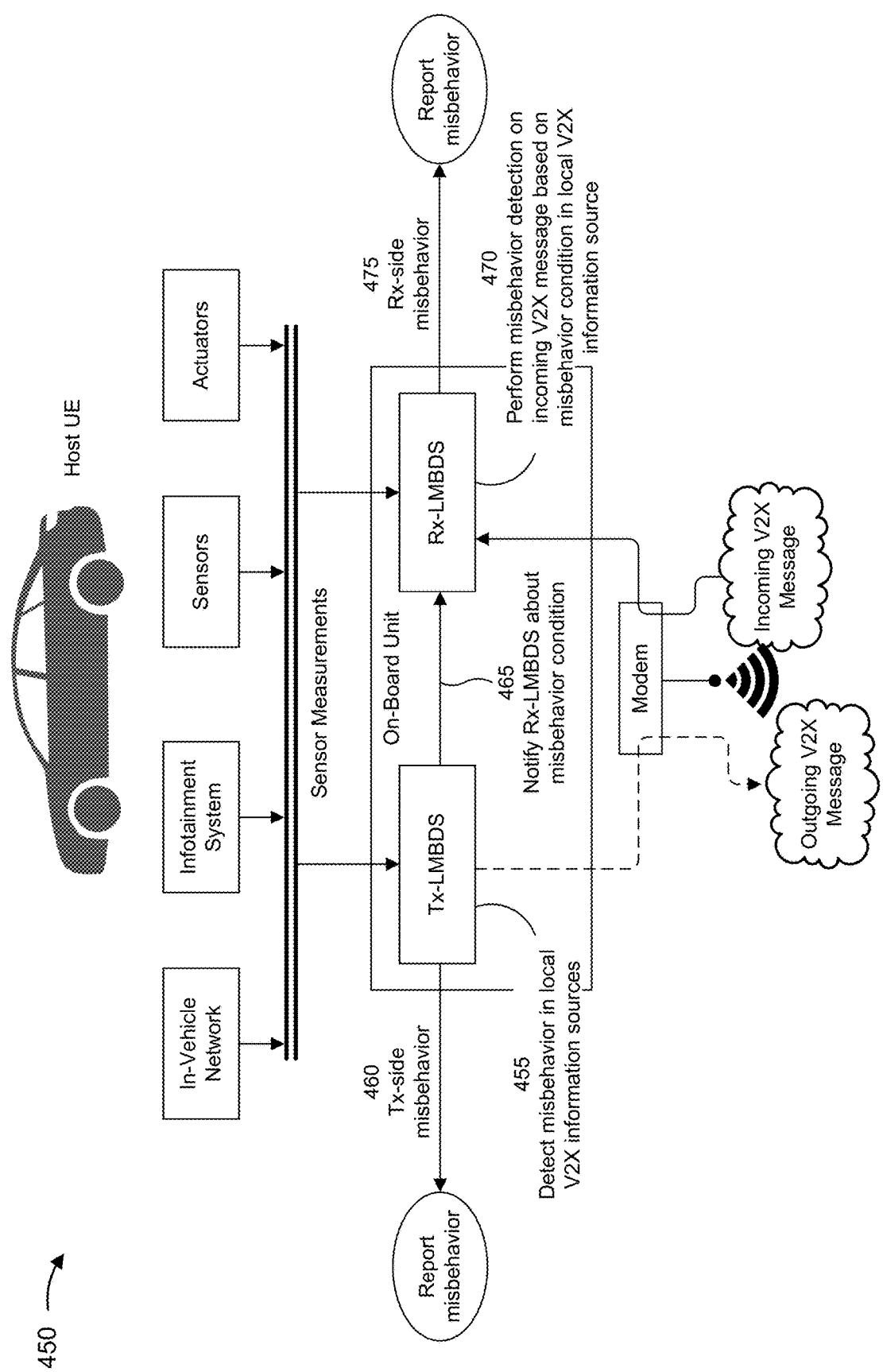

FIGS. 4A-4C are diagrams illustrating examples 400, 450 associated with notifying local V2X misbehavior to a receive-side local misbehavior detection system (Rx-LMBDS), in accordance with the present disclosure. As shown in FIGS. 4A-4C, examples 400, 450 include a host UE that may engage in V2X communication with one or more remote UEs (not explicitly shown in FIG. 4A or FIG. 4C). For example, as described herein, the host UE may transmit one or more outgoing V2X messages to a remote UE and/or receive one or more incoming V2X messages from a remote UE over a sidelink channel. Furthermore, as described herein, the host UE may include an on-board unit equipped with an Rx-LMBDS and a transmit-side local misbehavior detection system (Tx-LMBDS) to detect and mitigate misbehavior in incoming V2X messages and/or outgoing V2X messages.

In particular, V2X communication has the potential to tremendously improve vehicle safety technology by enabling V2X-equipped UEs to exchange telematics information to create awareness, especially in non-line-of-sight (NLoS) conditions. For example, in some cases, a V2X-equipped UE may transmit a BSM or a CAM that contains information related to a position and a kinematic state of the transmitting UE, which other (receiving) UEs can use to enable anti-collision or other safety functions. When various V2X-equipped UEs are regularly exchanging information related to their respective positions and kinematic states, the receiving UEs may have sufficient information to control a speed, direction of travel, and/or braking to avoid collisions and maintain an efficient and safe position. In this way, V2X communication has the potential to improve traffic flow by safely reducing distances separating vehicles traveling on roadways, platooning several vehicles together, and/or avoiding vehicles that are experiencing breakdowns, among other examples. Furthermore, because some objects on roadways may lack V2X capabilities (e.g., non-V2X vehicles, pedestrians, obstacles, and/or animals), V2X-equipped UEs may transmit CPMs to share sensor data that includes observations related to such non-V2X objects, which may further improve traffic patterns and/or safety for V2X-equipped UEs and non-V2X objects by increasing awareness of roadway conditions.

Accordingly, because BSMs, CAMs, CPMs, and/or other V2X messages are designed to inform driving decisions that are made by human operators and/or automated driving systems, V2X communication needs to be highly reliable to satisfy mission-critical safety requirements. For example, an attacker could potentially send a V2X message that carries false, misleading, or inaccurate information in order to adversely impact the telematics awareness of a receiving UE with V2X capabilities (e.g., an attacker targeting V2X communication may transmit authenticated-but-wrong data to send false location information, alert incorrect events, and/or report a bogus object endangering the safety of a V2X-equipped UE). Accordingly, one or more misbehavior detection systems may be used in a V2X communication system to detect V2X misbehavior that occurs when an intelligent transportation system station (ITS-S) (e.g., a vehicle, roadside unit (RSU), network node, or other device equipped with V2X capabilities) transmits false or misleading information, or information that was not authorized by local policy, whether purposefully or unintentionally. For example, misbehavior in a V2X communication system may include suspicious behaviors such as wrong message types, wrong message contents or frequencies, unauthorized access, and/or incorrect signed or encrypted messages, among other examples. Accordingly, one or more misbehavior detection systems may be used to detect and mitigate potentially adverse conditions that may otherwise occur when misbehavior results in V2X messages carrying false, misleading, or unauthorized information.

For example, as shown in FIG. 4A, and by reference number 405, receive-side misbehavior detection may be performed at a local level, where a V2X-equipped host UE includes an on-board unit with an Rx-LMBDS that uses information from one or more local V2X information sources to determine whether received V2X information (e.g., one or more incoming V2X messages, such as a BSM, CAM, CPM, and/or DENM) include signs or indicators of misbehavior (e.g., false, misleading, and/or unauthorized information). For example, as shown in FIG. 4A, the local V2X information sources may include an in-vehicle network (e.g., a controller area network (CAN), a local interconnect network (LIN), a network that uses the FlexRay automotive network communications protocol, a media oriented systems transport (MOST) network, and/or an automotive Ethernet network), an infotainment system that delivers information and entertainment (e.g., phone calls, music, navigation, and/or vehicle status) to vehicle occupants through audio/ video interfaces, vehicle sensors (e.g., a GNSS receiver, one or more cameras, radars, lidars, ultrasonic sensors, proximity sensors, infrared sensors, or the like), and/or vehicle actuators (e.g., physical control systems used to control steering, braking, engine operation, lights, directional signals, and/or other driving functions). Furthermore, in some cases, the Rx-LMBDS may use previously received V2X messages as a (non-local) V2X information source (e.g., the informational content of a V2X message, a target device or destination of the V2X message, a rapidity or frequency at which multiple V2X messages have been sent, and/or an amplitude or power level at which a V2X message has been sent).

Accordingly, the Rx-LMBDS associated with the host UE may generally use the local V2X information sources and/or information associated with previously received V2X messages to generate a misbehavior decision for an incoming V2X message. In general, when the incoming V2X message does not include signs or indicators of misbehavior, the incoming V2X message may be further processed to increase awareness of the environment surrounding the host UE (e.g., the locations and/or kinematic states of V2X devices and/or non-V2X objects that are in the environment surrounding the host UE). Alternatively, as shown by reference number 410, the host UE may report any misbehavior that the Rx-LMBDS detects in an incoming V2X message to a central authority (e.g., by transmitting or otherwise communicating a message that relates to the detected misbehavior to a management entity). Accordingly, V2X misbehavior detection may also be performed at a global level, where the central authority performs misbehavior detection based on reports that are received from on-road V2X devices (e.g., the host UE) that have performed local misbehavior detection (e.g., using the Rx-LMBDS).

In some aspects, as shown by reference number 415, a V2X-equipped host UE may include a Tx-LMBDS that may be used to detect misbehavior in the local V2X information sources in order to supplement, augment, or otherwise improve upon the receive-side misbehavior detection performed by the Rx-LMBDS. For example, the Tx-LMBDS may be configured to detect malfunctions in the local V2X information sources (e.g., malfunctioning equipment, such as a sensor or actuator that failed a test procedure) and/or malicious local V2X information sources (e.g., one or more sensors, actuators, or other equipment may have been attacked or otherwise compromised such that the equipment is generating false, misleading, or unauthorized information). In this way, the Tx-LMBDS may prevent the UE from transmitting an outgoing V2X message when Tx-side misbehavior is detected in the outgoing V2X message (e.g., position, kinematic, and/or other V2X information carried in the outgoing V2X message is based on information generated by one or more local V2X information sources associated with a misbehavior condition, such as an indicator of a malfunction or malicious behavior). Furthermore, as shown by reference number 420, the host UE may report any misbehavior detected in the local V2X information sources to a central authority (e.g., by transmitting or otherwise communicating a message that relates to the detected misbehavior to a management entity). Accordingly, the management entity may also perform V2X misbehavior detection at the global level based on reports that relate to locally detected transmit-side misbehavior (e.g., malfunctioning or malicious local equipment). Alternatively, as shown by reference number 425, the Tx-LMBDS may permit the outgoing V2X message to be transmitted to remote V2X devices in cases where the outgoing V2X message does not contain any signs or indicators of local misbehavior. In this way, the Rx-LMBDS and the Tx-LMBDS may perform local misbehavior detection to avoid processing incoming V2X messages or transmitting outgoing V2X messages that include signs or indicators of misbehavior.

In some aspects, in example 400, the Rx-LMBDS and the Tx-LMBDS are shown as operating in a siloed (e.g., independent) manner, without any information sharing between the Rx-LMBDS and the Tx-LMBDS. For example, to generate a misbehavior decision for an incoming V2X message, the Rx-LMBDS may need to trust the information that the Rx-LMBDS receives from local V2X information sources in order to minimize errors in the misbehavior decision. However, operating the Rx-LMBDS and the Tx-LMBDS in a siloed manner may result in the Rx-LMBDS making a false or incorrect misbehavior decisions in cases where the misbehavior decision is based on one or more inputs from one or more local V2X information sources that are malfunctioning, malicious, and/or otherwise associated with a misbehavior condition.

For example, FIG. 4B illustrates one use case in which the Rx-LMBDS may potentially make a false or incorrect misbehavior decisions when relying on input from one or more local V2X information sources associated with a misbehavior condition. For example, in FIG. 4B, reference numbers 430 and 435 depict example scenarios in which a position overlap misbehavior detector associated with the Rx-LMBDS checks for position overlaps between the host UE and the remote UE by determining whether respective positions of the host UE and the remote UE are within a threshold (e.g., a GNSS drift threshold). Accordingly, to check whether the host UE and the remote UE have overlapping positions (e.g., to avoid a collision), the host UE may need to have accurate position information from the GNSS receiver of the host UE. However, in cases where the GNSS receiver is malfunctioning or the GNSS receiver has been maliciously compromised, the position overlap calculations may be incorrect, which may result in an incorrect misbehavior decision by the Rx-LMBDS.

For example, referring to FIG. 4B, reference number 430 depicts a first scenario in which there is no misbehavior condition in local V2X equipment (e.g., the GNSS receiver is providing accurate position information to the host UE). As shown, the host UE may have a position of (0,0) and the remote UE may have a position of (10,0) in units of a Cartesian coordinate system, and the host UE and the remote UE may each be associated with a GNSS uncertainty or GNSS drift of two (2) units. In the first scenario, where all V2X information sources are working properly and there is no misbehavior, the GNSS drift (or Euclidean distance) between the host UE and the remote UE may be correctly calculated as ten (10) units. Furthermore, in this case, the position overlap detector does not detect any potential overlap in the positions of the host UE and the remote UE. For example, based on the host UE and the remote UE each having a GNSS drift of 2 units, a position of the host UE may be anywhere between (−2,0) and (2,0) and a non-overlapping position of the remote UE may be anywhere between (8,0) and (12,0). However, in cases where the local GNSS receiver of the host UE is associated with a misbehavior condition (e.g., a malfunction or malicious activity), the local GNSS receiver may provide inaccurate position information that may cause a false misbehavior decision. For example, in FIG. 4B, reference number 435 depicts a second scenario where a misbehavior condition is causing the local GNSS receiver of the host UE to provide positions that are shifted by a value of eight (8). In this case, the position of the host UE could be anywhere in a range from (−8, 0) to (8, 0), whereby the distance between the host UE and the remote UE could be anywhere in a range from 18 units to 2 units. Assuming that the position overlap detector is operating with a GNSS drift threshold of 2 (e.g., a distance that is less than or equal to 2 results in a position overlap), the position overlap detector would not generate a warning if the position of the host UE is indicated as (−8, 0). However, if the distance between the host UE and the remote UE is determined as 2 based on GNSS receiver misbehavior giving a location of (8,0), the distance would fail to satisfy the GNSS drift threshold and the position overlap detector would generate a warning.

In another example scenario, a misbehavior condition in one or more local V2X information sources may cause incorrect misbehavior decisions by a position speed acceleration consistency detector. For example, the position speed acceleration consistency detector may generally require accurate speed and acceleration information from the corresponding speed and acceleration sensors. The position speed acceleration consistency detector may estimate the expected position of a remote vehicle in a current time step based on information related to a position, speed, and acceleration of the remote vehicle at a previous time step, which may be determined based at least in part on information from one or more local V2X information sources (e.g., local speed and/or acceleration sensors). The expected position of the remote vehicle is then compared to the actual position of the remote vehicle at a current time step, which may be indicated in a BSM, CAM, or other incoming V2X message. If the Euclidean distance between the expected position and the actual position of the remote vehicle fail to satisfy a drift threshold, the position speed acceleration consistency detector may detect Rx-side misbehavior in the incoming V2X message. Accordingly, the Rx-LMBDS may generate an incorrect misbehavior decision for an incoming V2X message in cases where the position speed acceleration consistency detector is relying upon misbehaving local V2X information sources to estimate the expected position of the remote vehicle. Furthermore, in another problem scenario, a malicious UE that wants to cross an intersection may compromise a local V2X information source (e.g., a speed sensor) to provide higher speed values. In this scenario, other vehicles approaching the intersection calculate lower time-to-collision and distance-to-collision with the malicious UE, which may result in the other vehicles not entering the intersection to avoid collision and the malicious UE passing through the intersection with no traffic.

Accordingly, because misbehavior conditions in local V2X information sources may result in the Rx-LMBDS making incorrect misbehavior decisions when processing incoming V2X messages, the Tx-LMBDS may notify the Rx-LMBDS when a malfunction, malicious activity, or other misbehavior condition is detected in one or more local V2X information sources. In this way, the Rx-LMBDS may perform one or more actions to reduce false misbehavior detections in incoming V2X messages and help to maintain the stability of an overall V2X communication system under such suboptimal conditions (e.g., by avoiding reporting false local misbehavior detections to the central authority that performs global misbehavior detection).

For example, as shown in FIG. 4C, and by reference number 455, the Tx-LMBDS may detect a misbehavior condition in one or more local V2X information sources, such as an in-vehicle network, an infotainment system, one or more sensors, and/or one or more actuators, among other examples. As shown by reference number 460, the Tx-LMBDS may transmit a message (e.g., via a modem) to a management entity to report the misbehavior in the local V2X information source(s) in a similar manner as described above with reference to FIG. 4A. Furthermore, as shown by reference number 465, the Tx-LMBDS may provide a notification related to the misbehavior condition to the Rx-LMBDS. For example, in some aspects, the notification may indicate that one or more V2X information sources failed a test procedure, that one or more V2X information sources are providing inconsistent or otherwise untrustworthy information, or that one or more V2X information sources are malfunctioning or exhibiting signs or indicators of malicious activity. Accordingly, as shown by reference number 470, the Rx-LMBDS may perform misbehavior detection for an incoming V2X message based on the misbehavior condition in the one or more local V2X information sources, which may reduce the number of false or incorrect misbehavior decisions generated by the Rx-LMBDS. Furthermore, in cases where the Rx-LMBDS reports misbehavior that is detected in an incoming V2X message (e.g., as shown by reference number 475), the misbehavior decisions reported by the Rx-LMBDS may be more reliable. For example, in the second scenario shown in FIG. 4B, where the GNSS receiver of the host UE is providing inaccurate position information, the Tx-LMBDS may detect the misbehavior condition in the local GNSS receiver and notify the Rx-LMBDS. In one example, the Rx-LMBDS may stop running misbehavior detectors that rely on one or more inputs from the local GNSS receiver (e.g., the position overlap detector) to avoid generating incorrect misbehavior decisions.

Accordingly, in some aspects described herein, the Rx-LMBDS may generate misbehavior decisions for incoming V2X messages based on one or more notifications from the Tx-LMBDS that relate to malfunctions, malicious activities, or other misbehavior conditions that are detected in one or more local V2X information sources. For example, when the Tx-LMBDS detects a misbehavior condition in a local V2X information source, the Tx-LMBDS may notify the Rx-LMBDS, and the Rx-LMBDS may filter, ignore, or otherwise avoid using one or more inputs from the misbehaving local V2X information source(s) when generating misbehavior decisions for incoming V2X messages. Additionally, or alternatively, the Rx-LMBDS may disable or enable one or more misbehavior detectors that use one or more inputs from the misbehaving local V2X information source(s). Additionally, or alternatively, the Rx-LMBDS may be disabled entirely in cases where the number of misbehaving local V2X information sources satisfies (e.g., equals or exceeds) a threshold. Additionally, or alternatively, the Rx-LMBDS may perform other suitable actions to reduce the number of false misbehavior decisions (e.g., false positives and/or false negatives) and/or increase the accuracy or reliability of misbehavior decisions for incoming V2X messages. For example, in some aspects, the Rx-LMBDS may assign a lower weight to misbehavior detectors that use one or more inputs from the misbehaving local V2X information sources, modify one or more misbehavior detection parameters based on an error or uncertainty caused by the misbehavior conditions in the local V2X information sources (e.g., increasing a GNSS drift threshold for comparing an expected and actual position), inform an original equipment manufacturer (OEM) that a misbehaving local V2X information source is faulty, and/or switch to a backup data source for one or more misbehaving local V2X information sources (e.g., when the host UE has redundant sensors or other backup data sources available, such as a cellular positioning system that may be used when a GNSS receiver is misbehaving).

As indicated above, FIGS. 4A-4C are provided as an example. Other examples may differ from what is described with respect to FIGS. 4A-4C.

Figure 5:
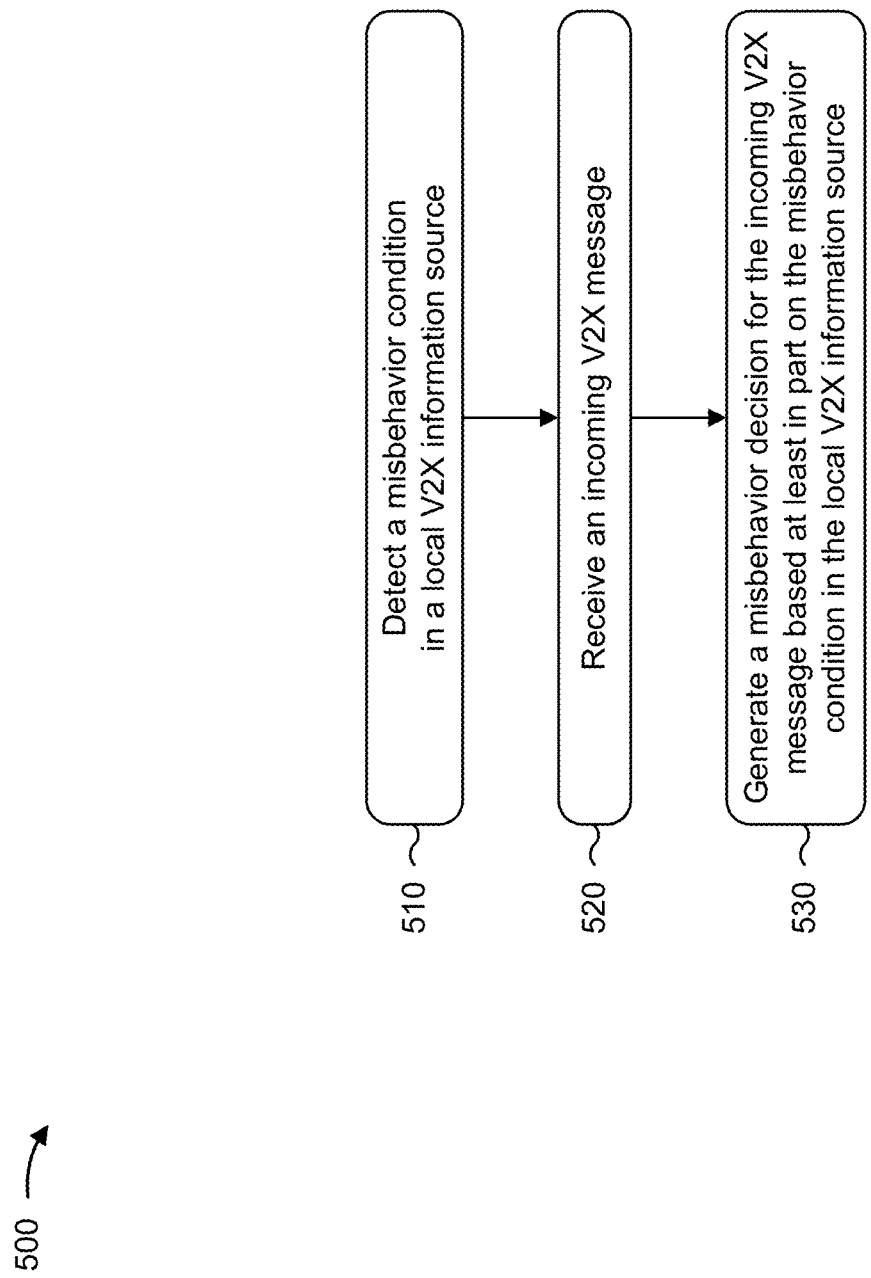
FIG. 5 is a diagram illustrating an example process associated with notifying local V2X misbehavior to an Rx-LMBDS, in accordance with the present disclosure.

FIG. 5 is a diagram illustrating an example process 500 performed, for example, by a UE, in accordance with the present disclosure. Example process 500 is an example where the UE (e.g., UE 120) performs operations associated with notifying local V2X misbehavior to an Rx-LMBDS.

As shown in FIG. 5, in some aspects, process 500 may include detecting a misbehavior condition in a local V2X information source (block 510). For example, the UE (e.g., using communication manager 140 and/or Tx-LMBDS 608, depicted in FIG. 6) may detect a misbehavior condition in a local V2X information source, as described above.

As further shown in FIG. 5, in some aspects, process 500 may include receiving an incoming V2X message (block 520). For example, the UE (e.g., using communication manager 140 and/or reception component 602, depicted in FIG. 6) may receive an incoming V2X message, as described above.

As further shown in FIG. 5, in some aspects, process 500 may include generating a misbehavior decision for the incoming V2X message based at least in part on the misbehavior condition in the local V2X information source (block 530). For example, the UE (e.g., using communication manager 140 and/or Rx-LMBDS 610, depicted in FIG. 6) may generate a misbehavior decision for the incoming V2X message based at least in part on the misbehavior condition in the local V2X information source, as described above.

Process 500 may include additional aspects, such as any single aspect or any combination of aspects described below and/or in connection with one or more other processes described elsewhere herein.

In a first aspect, generating the misbehavior decision for the incoming V2X message includes filtering or ignoring one or more inputs from the local V2X information source associated with the misbehavior condition.

In a second aspect, alone or in combination with the first aspect, generating the misbehavior decision for the incoming V2X message includes enabling or disabling one or more misbehavior detectors that are configured to receive one or more inputs from the local V2X information source associated with the misbehavior condition.

In a third aspect, alone or in combination with one or more of the first and second aspects, generating the misbehavior decision for the incoming V2X message includes disabling an Rx-LMBDS based at least in part on a number of local V2X information sources associated with misbehavior conditions satisfying a threshold.

In a fourth aspect, alone or in combination with one or more of the first through third aspects, generating the misbehavior decision for the incoming V2X message includes assigning a lower weight to one or more inputs from the local V2X information source associated with the misbehavior condition.

In a fifth aspect, alone or in combination with one or more of the first through fourth aspects, generating the misbehavior decision for the incoming V2X message includes modifying one or more misbehavior detection parameters based at least in part on an error or an uncertainty caused by the misbehavior condition associated with the local V2X information source.

In a sixth aspect, alone or in combination with one or more of the first through fifth aspects, process 500 includes transmitting, to a management entity, a report that includes information associated with the misbehavior condition.

In a seventh aspect, alone or in combination with one or more of the first through sixth aspects, generating the misbehavior decision for the incoming V2X message includes obtaining one or more inputs from a backup data source for the local V2X information source.

In an eighth aspect, alone or in combination with one or more of the first through seventh aspects, the misbehavior condition is detected in the local V2X information source by a Tx-LMBDS, and wherein the misbehavior decision for the incoming V2X message is generated by an Rx-LMBDS.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
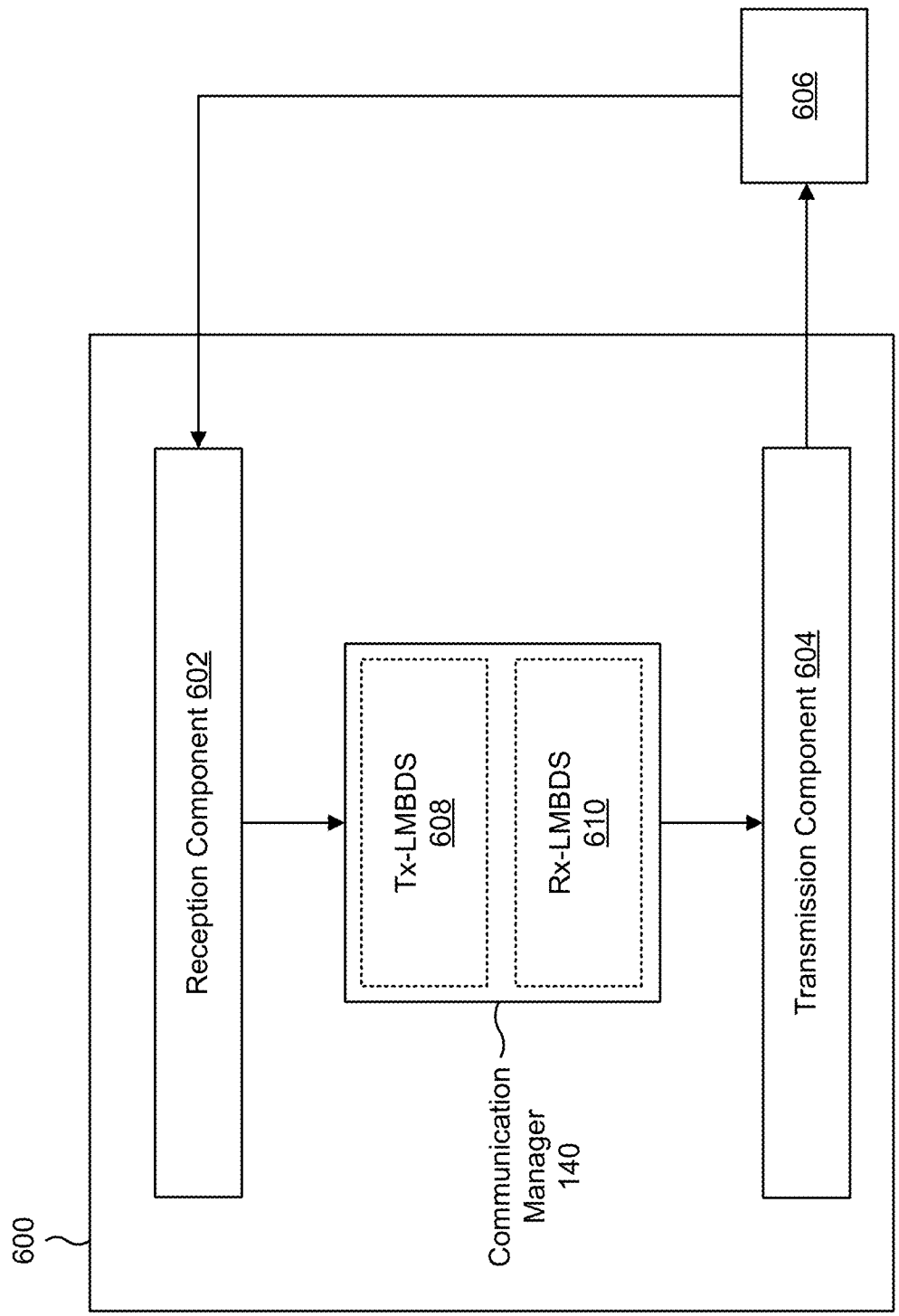
FIG. 6 is a diagram of an example apparatus for wireless communication, in accordance with the present disclosure.

FIG. 6 is a diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include one or more of a Tx-LMBDS 608 or an Rx-LMBDS 610, among other examples.

In some aspects, the apparatus 600 may be configured to perform one or more operations described herein in connection with FIGS. 4A-4C. Additionally, or alternatively, the apparatus 600 may be configured to perform one or more processes described herein, such as process 500 of FIG. 5. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The Tx-LMBDS 608 may detect a misbehavior condition in a local V2X information source. The reception component 602 may receive an incoming V2X message. The Rx-LMBDS 610 may generate a misbehavior decision for the incoming V2X message based at least in part on the misbehavior condition in the local V2X information source.

The transmission component 604 may transmit, to a management entity, a report that includes information associated with the misbehavior condition.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a UE, comprising: detecting a misbehavior condition in a local V2X information source; receiving an incoming V2X message; and generating a misbehavior decision for the incoming V2X message based at least in part on the misbehavior condition in the local V2X information source.

Aspect 2: The method of Aspect 1, wherein generating the misbehavior decision for the incoming V2X message includes filtering or ignoring one or more inputs from the local V2X information source associated with the misbehavior condition.

Aspect 3: The method of any of Aspects 1-2, wherein generating the misbehavior decision for the incoming V2X message includes enabling or disabling one or more misbehavior detectors that are configured to receive one or more inputs from the local V2X information source associated with the misbehavior condition.

Aspect 4: The method of any of Aspects 1-3, wherein generating the misbehavior decision for the incoming V2X message includes disabling an Rx-LMBDS based at least in part on a number of local V2X information sources associated with misbehavior conditions satisfying a threshold.

Aspect 5: The method of any of Aspects 1-4, wherein generating the misbehavior decision for the incoming V2X message includes assigning a lower weight to one or more inputs from the local V2X information source associated with the misbehavior condition.

Aspect 6: The method of any of Aspects 1-5, wherein generating the misbehavior decision for the incoming V2X message includes modifying one or more misbehavior detection parameters based at least in part on an error or an uncertainty caused by the misbehavior condition associated with the local V2X information source.

Aspect 7: The method of any of Aspects 1-6, further comprising: transmitting, to a management entity, a report that includes information associated with the misbehavior condition.

Aspect 8: The method of any of Aspects 1-7, wherein generating the misbehavior decision for the incoming V2X message includes obtaining one or more inputs from a backup data source for the local V2X information source.

Aspect 9: The method of any of Aspects 1-8, wherein the misbehavior condition is detected in the local V2X information source by a Tx-LMBDS, and wherein the misbehavior decision for the incoming V2X message is generated by an Rx-LMBDS.

Aspect 10: An apparatus for wireless communication at a device, comprising a processor; memory coupled with the processor; and instructions stored in the memory and executable by the processor to cause the apparatus to perform the method of one or more of Aspects 1-9.

Aspect 11: A device for wireless communication, comprising a memory and one or more processors coupled to the memory, the one or more processors configured to perform the method of one or more of Aspects 1-9.

Aspect 12: An apparatus for wireless communication, comprising at least one means for performing the method of one or more of Aspects 1-9.

Aspect 13: A non-transitory computer-readable medium storing code for wireless communication, the code comprising instructions executable by a processor to perform the method of one or more of Aspects 1-9.

Aspect 14: A non-transitory computer-readable medium storing a set of instructions for wireless communication, the set of instructions comprising one or more instructions that, when executed by one or more processors of a device, cause the device to perform the method of one or more of Aspects 1-9.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   detecting, via an on-board unit of the UE, a misbehavior condition in a local vehicle-to-everything (V2X) information source, wherein the local V2X information source comprises a local global navigation satellite system (GNSS) receiver;
   receiving an incoming V2X message; and
   generating, via a receive-side local misbehavior detection system of the on-board unit, a misbehavior decision for the incoming V2X message based at least in part on the misbehavior condition in the local V2X information source and information corresponding to one or more previously received V2X messages;
   wherein generating the misbehavior decision for the incoming V2X message includes assigning a lower weight to one or more inputs from the local V2X information source associated with the misbehavior condition, and disabling the receive-side local misbehavior detection system based at least in part on a number of local V2X information sources associated with misbehavior conditions equaling or exceeding a threshold, and
   wherein, in response to detecting the misbehavior condition in the local GNSS receiver, the on-board unit initiates a system-level action to stop operation of a position overlap detector that relies on inputs from the local GNSS receiver.

2. The method of claim 1, wherein generating the misbehavior decision for the incoming V2X message includes filtering or ignoring one or more inputs from the local V2X information source associated with the misbehavior condition.

3. The method of claim 1, wherein generating the misbehavior decision for the incoming V2X message includes enabling or disabling one or more misbehavior detectors that are configured to receive one or more inputs from the local V2X information source associated with the misbehavior condition.

4. The method of claim 1, wherein generating the misbehavior decision for the incoming V2X message includes modifying one or more misbehavior detection parameters based at least in part on an error or an uncertainty caused by the misbehavior condition associated with the local V2X information source.

5. The method of claim 1, further comprising:
transmitting, to a management entity, a report that includes information associated with the misbehavior condition.

6. The method of claim 1, wherein generating the misbehavior decision for the incoming V2X message includes obtaining one or more inputs from a backup data source for the local V2X information source.

7. The method of claim 1, wherein the misbehavior condition is detected in the local V2X information source by a transmit-side local misbehavior detection system of the on-board unit.

8. A user equipment (UE) for wireless communication, comprising:
one or more memories; and
one or more processors, coupled to the one or more memories, configured to:
detect, via an on-board unit of the UE, a misbehavior condition in a local vehicle-to-everything (V2X) information source, wherein the local V2X information source comprises a local global navigation satellite system (GNSS) receiver;
receive an incoming V2X message; and
generate, via a receive-side local misbehavior detection system of the on-board unit, a misbehavior decision for the incoming V2X message based at least in part on the misbehavior condition in the local V2X information source and one or more previously received V2X messages;
wherein the one or more processors, to generate the misbehavior decision for the incoming V2X message, are configured to:
assign a lower weight to one or more inputs from the local V2X information source associated with the misbehavior condition,
disable the receive-side local misbehavior detection system based at least in part on a number of local V2X information sources associated with misbehavior conditions equaling or exceeding a threshold, and
in response to detecting the misbehavior condition in the local GNSS receiver, initiate a system-level action to stop operation of a position overlap detector that relies on inputs from the local GNSS receiver.

9. The UE of claim 8, wherein the one or more processors, to generate the misbehavior decision for the incoming V2X message, are configured to filter or ignore one or more inputs from the local V2X information source associated with the misbehavior condition.

10. The UE of claim 8, wherein the one or more processors, to generate the misbehavior decision for the incoming V2X message, are configured to enable or disable one or more misbehavior detectors that are configured to receive one or more inputs from the local V2X information source associated with the misbehavior condition.

11. The UE of claim 8, wherein the one or more processors, to generate the misbehavior decision for the incoming V2X message, are configured to modify one or more misbehavior detection parameters based at least in part on an error or an uncertainty caused by the misbehavior condition associated with the local V2X information source.

12. The UE of claim 8, wherein the one or more processors are further configured to:
transmit, to a management entity, a report that includes information associated with the misbehavior condition.

13. The UE of claim 8, wherein the one or more processors, to generate the misbehavior decision for the incoming V2X message, are configured to obtain one or more inputs from a backup data source for the local V2X information source.

14. The UE of claim 8, wherein the misbehavior condition is detected in the local V2X information source by a transmit-side local misbehavior detection system of the on-board unit.

15. A non-transitory computer-readable medium storing a set of instructions for wireless communication, the set of instructions comprising:
one or more instructions that, when executed by one or more processors of a user equipment (UE), cause the UE to:
detect, via an on-board unit of the UE, a misbehavior condition in a local vehicle-to-everything (V2X) information source, wherein the local V2X information source comprises a local global navigation satellite system (GNSS) receiver;
receive an incoming V2X message; and
generate, via a receive-side local misbehavior detection system of the on-board unit, a misbehavior decision for the incoming V2X message based at least in part on the misbehavior condition in the local V2X information source and one or more previously received V2X messages;
wherein the one or more instructions, that cause the UE to generate the misbehavior decision for the incoming V2X message, cause the UE to:
assign a lower weight to one or more inputs from the local V2X information source associated with the misbehavior condition,
disable the receive-side local misbehavior detection system based at least in part on a number of local V2X information sources associated with misbehavior conditions equaling or exceeding a threshold, and
in response to detecting the misbehavior condition in the local GNSS receiver, initiate a system-level action to stop operation of a position overlap detector that relies on inputs from the local GNSS receiver.

16. The non-transitory computer-readable medium of claim 15, wherein the one or more instructions, that cause the UE to generate the misbehavior decision for the incoming V2X message, cause the UE to filter or ignore one or more inputs from the local V2X information source associated with the misbehavior condition.

17. The non-transitory computer-readable medium of claim 15, wherein the one or more instructions, that cause the UE to generate the misbehavior decision for the incoming V2X message, cause the UE to enable or disable one or more misbehavior detectors that are configured to receive one or more inputs from the local V2X information source associated with the misbehavior condition.

18. The non-transitory computer-readable medium of claim 15, wherein the one or more instructions, that cause the UE to generate the misbehavior decision for the incoming V2X message, cause the UE to modify one or more misbehavior detection parameters based at least in part on an error or an uncertainty caused by the misbehavior condition associated with the local V2X information source.

19. A receive-side local misbehavior detection system, comprising
one or more memories; and one or more processors, coupled to the one or more memories, configured to:
receive a notification from a transmit-side local misbehavior detection system corresponding to a misbehavior condition for an incoming vehicle-to-everything (V2X) message, the notification indicating that a local V2X information source has failed a test procedure or is malfunctioning; and
generate a misbehavior decision for the incoming V2X message based at least in part on a misbehavior condition in the local V2X information source and information corresponding to one or more previously received V2X messages, wherein the local V2X information source comprises a local global navigation satellite system (GNSS) receiver, and wherein the one or more processors, to generate the misbehavior decision for the incoming V2X message, are configured to:
disable the receive-side local misbehavior detection system based at least in part on a number of local V2X information sources associated with misbehavior conditions equaling or exceeding a threshold, and
initiate a system-level action to stop running a position overlap detector that relies on inputs from the local GNSS receiver based at least in part on the notification.

20. The receive-side local misbehavior detection system of claim 19, wherein the local V2X information source includes one or more vehicle sensors, the one or more vehicle sensors including at least one of: ultrasonic sensors, proximity sensors, or infrared sensors.

21. The receive-side local misbehavior detection system of claim 19, wherein the local V2X information source includes an in-vehicle network, the in-vehicle network including at least one of: a controller area network, a local interconnect network, a media-oriented systems transport network, or an automotive Ethernet network.

22. The receive-side local misbehavior detection system of claim 19, wherein the local V2X information source includes an infotainment system configured to provide information and entertainment to vehicle occupants.

23. The receive-side local misbehavior detection system of claim 19, wherein the one or more processors, to generate the misbehavior decision, are configured to:
filter or ignore one or more inputs from the local V2X information source that corresponds to the misbehavior condition.

24. The receive-side local misbehavior detection system of claim 19, wherein the one or more processors are further configured to:
enable or disable at least one misbehavior detector based at least in part on the misbehavior condition.

25. The receive-side local misbehavior detection system of claim 19, wherein the one or more processors are further configured to:
report, to a central authority, information corresponding to the misbehavior decision.

26. The receive-side local misbehavior detection system of claim 19, wherein the local V2X information source includes one or more of: radars, lidars, or cameras.

27. The receive-side local misbehavior detection system of claim 19, wherein the one or more processors are further configured to:
modify one or more misbehavior detection parameters based at least in part on an error or an uncertainty caused by the misbehavior condition associated with the local V2X information source.

28. The receive-side local misbehavior detection system of claim 19, wherein the one or more processors are further configured to switch to a backup data source upon detecting the misbehavior condition in the local V2X information source.

29. The receive-side local misbehavior detection system of claim 19, wherein, in response to initiating the system-level action to stop running the position overlap detector that relies on inputs from the local GNSS receiver, the one or more processors are further configured to switch to a cellular positioning system to provide position information for subsequent misbehavior detection operations.

* * * * *